Figure 1:
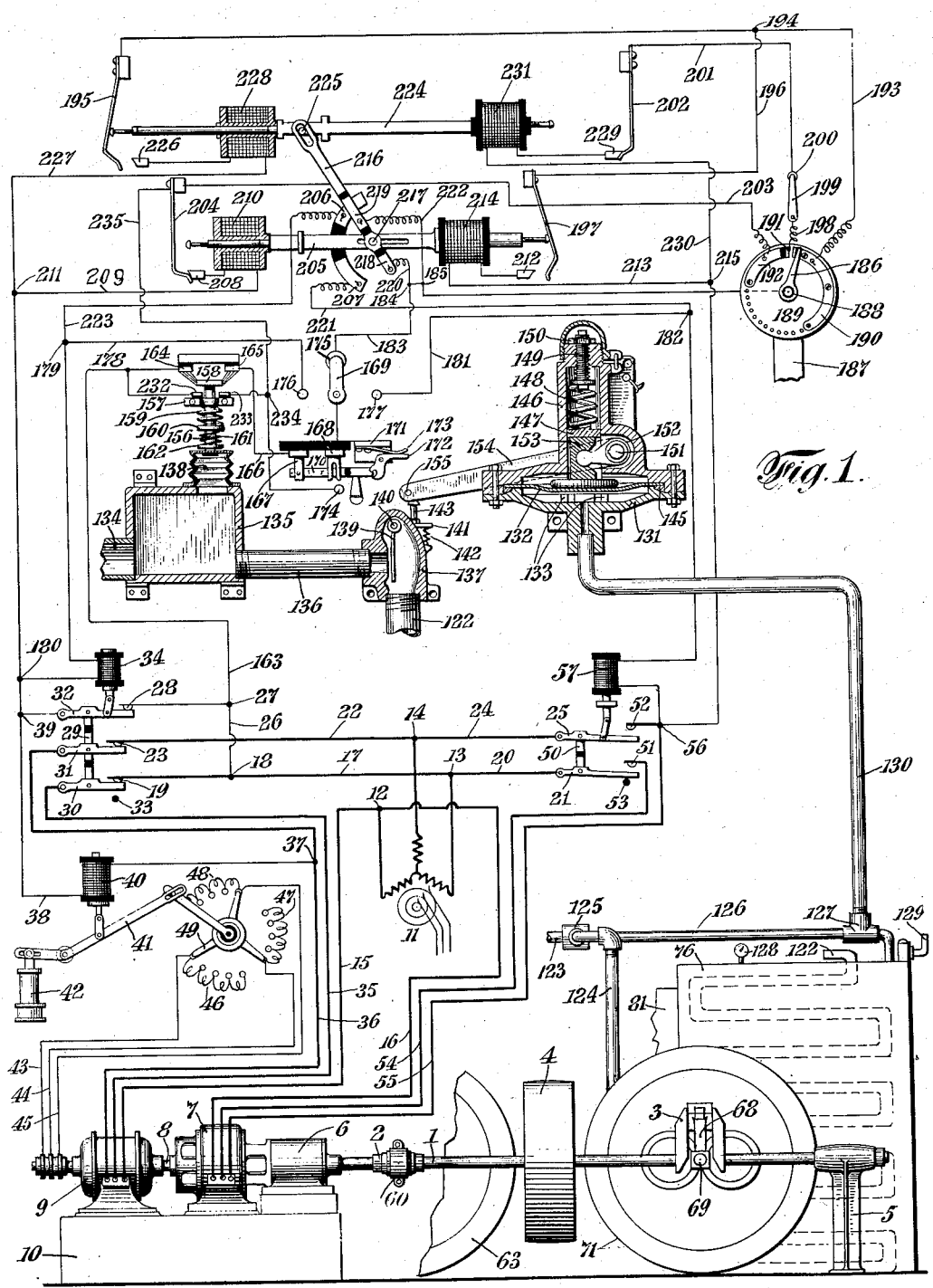

Feb. 20, 1923.

G. P. CARROLL.
MULTISPEED REFRIGERATING APPARATUS.
FILED JULY 22, 1918.

1,445,753.

3 SHEETS—SHEET 1.

Inventor
George P. Carroll

Feb. 20, 1923.
G. P. CARROLL.
MULTISPEED REFRIGERATING APPARATUS.
FILED JULY 22, 1918.
1,445,753.
3 SHEETS—SHEET 2.
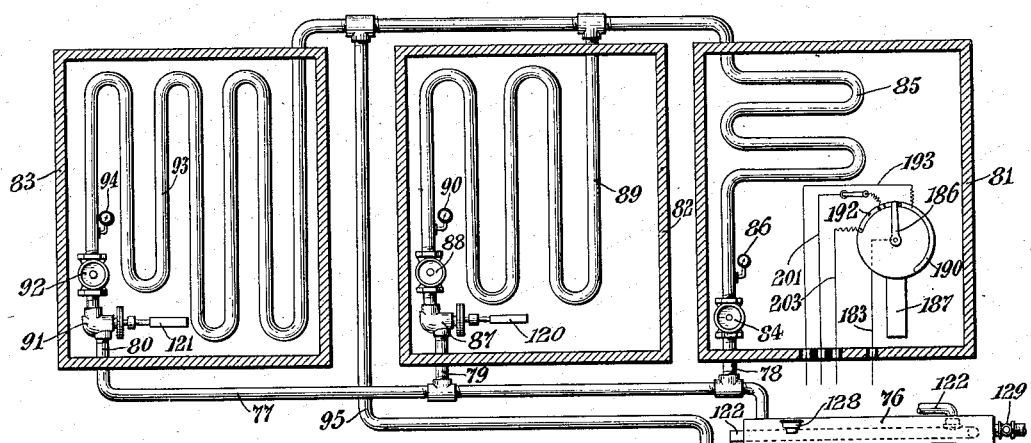
*Fig. 2.*
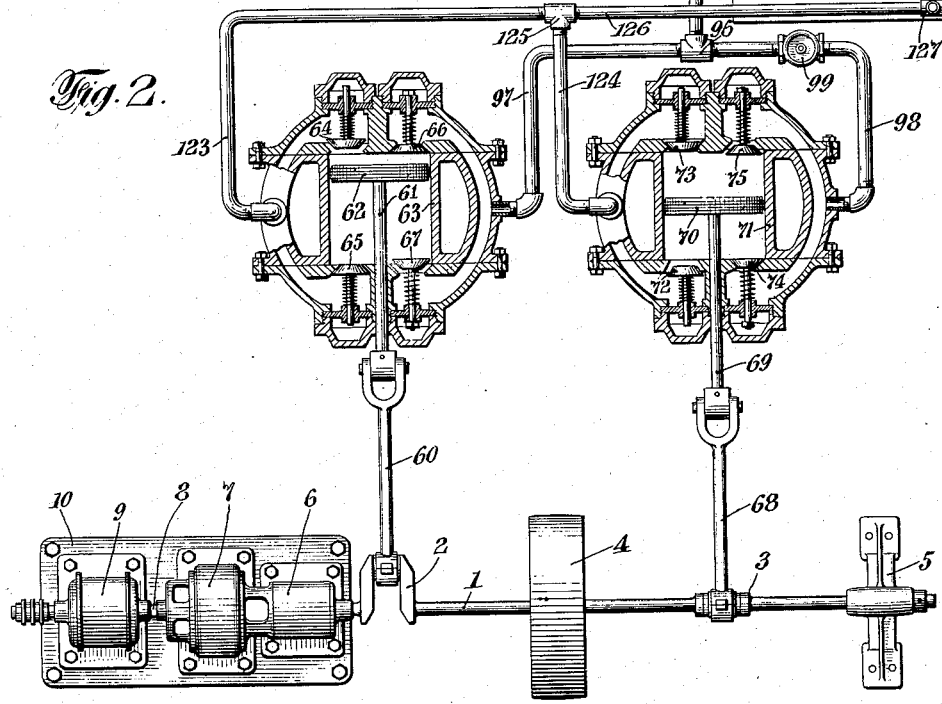
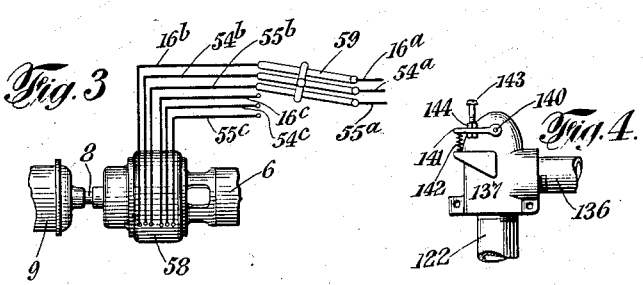
*Fig. 3.*   *Fig. 4.*   *Fig. 5.*
Inventor
George P. Carroll

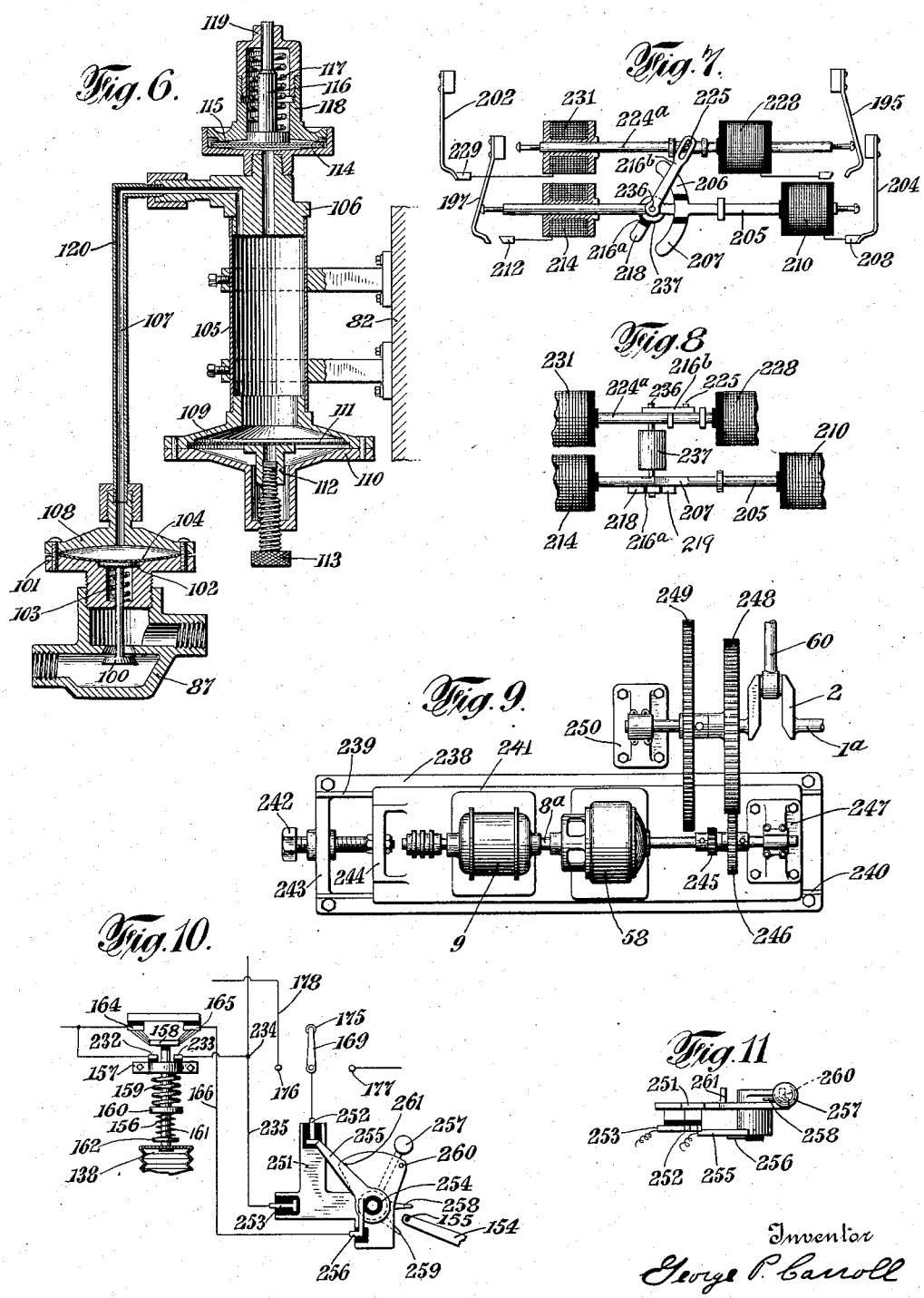

Patented Feb. 20, 1923.

1,445,753

UNITED STATES PATENT OFFICE.

GEORGE P. CARROLL, OF HARTFORD, CONNECTICUT.

MULTISPEED REFRIGERATING APPARATUS.

Application filed July 22, 1918. Serial No. 246,195.

*To all whom it may concern:*

Be it known that I, GEORGE P. CARROLL, a citizen of the United States, residing at Hartford, in the county of Hartford and State of Connecticut, have invented a new and useful Multispeed Refrigerating Apparatus, of which the following is the specification.

My invention relates to improvements in the means for controlling the operation of fluid circulating apparatus, especially where the fluid so circulated is employed in a refrigerating system and the circulating apparatus includes a high speed compressor, especially where such compressor is driven by an alternating current motor, preferably of the induction type. The purposes of my invention are to provide means whereby the speed of the apparatus may be varied, either by hand or by the action of a thermostat, according to the changing conditions that exist from time to time; to reduce to a minimum the recurrent stoppings and startings of the apparatus and the consequent waste of power; to provide means whereby the apparatus will be started to run at full speed for such period as may be necessary and then, if conditions so permit, at a lower speed; to accomplish the foregoing purposes in conjunction with safety devices whereby the operation of the apparatus is dependent upon an adequate supply of condensing water and whereby in case of an excessive head pressure, beyond the control of the maximum flow of condensing water, the operation of the apparatus is interrupted; to incorporate these safety devices in an apparatus operated by an alternating current motor, preferably of the induction type; and to provide safe, economical and efficient means for circulating fluid and forcing the same into a condenser, especially if constituting part of a refrigerating apparatus. There are also certain detail improvements of construction as will hereinafter appear. As ammonia is the typical fluid circulated for refrigerating purposes, my invention will be shown in connection with an apparatus using that fluid as a refrigerant.

In certain particulars this application is a continuation of certain features of construction disclosed in my pending applications Ser. No. 126,019, filed Oct. 16, 1916, Safety construction for refrigerant and other fluid circulating apparatus, Ser. No. 146,147, filed Feb. 2, 1917, Safety controlling mechanism for compressing machines, Ser. No. 209,670, filed Dec. 31, 1917, (with the same title), Ser. No. 212,263, filed Jan. 17, 1918, Controlling means for fluid circulating apparatus, and Ser. No. 224,018, filed March 22, 1918, Controlling mechanism for compressing apparatus.

In the drawings, Fig. 1 is a representation of part of one form of my invention, in part in front elevation, in part in vertical section and in part broken away. Fig. 2 is in part a plan view and in part a horizontal section of the construction which, in conjunction with the construction of the preceding figure, some elements being common to both figures, constitutes the first form of my invention. Fig. 3 is a front elevation of a detail construction which may be used in place of a part of the construction of the preceding figures. Fig. 4 is a rear elevation of the water regulator and certain connected parts shown in Fig. 1. Fig. 5 is a plan view of the right end of the main lever and certain connected parts shown in Fig. 1. Fig. 6 is a partial front elevation and a partial vertical section of a subordinate refrigerator thermostat shown in Fig. 2, with its connections. Fig. 7 is a rear elevation of a detail construction which may be used in place of part of the construction of Fig. 1. Fig. 8 is a view from beneath of part of the construction of the preceding figure. Fig. 9 is a plan view of a detail construction which may be used in place of part of the construction of Figs. 1 and 2. Fig. 10 is a front elevation and Fig. 11 is a plan view of a detail construction which may be used in place of part of the construction of Fig. 1.

First considering the construction of Figs. 1–6: A driving shaft 1, having cranks 2 and 3 at right angles with each other, carries a fly wheel 4 between the cranks, at its right end is journaled in a support 5 and at its left end is journaled in the frame of a speed reducer 6. Speed reducers, such as the reducer 6, are well known in the art, each such reducer having within its frame, running in oil, a pinion and a series of gears, either of the straight or the herring bone type, so arranged that a high speed shaft, by means of the reducer, causes another shaft, being in this case the shaft 1, to rotate at some predetermined reduced speed. The operative effect of the reducer 6 is similar to that of either of the pairs of pinions and gears shown in Fig. 9 and to be described later, the two constructions being mechanical equivalents. A three phase squirrel cage low speed induction motor 7 has its rotor mounted on a high speed shaft 8, that, at its right end is journaled in the frame of the reducer 6, being the high speed shaft thereof, as has been indicated. With its rotor mounted on the shaft 8, to the left of the motor 7, is a three phase slip ring induction high speed motor 9. The parts 6, 7 and 9 have a common base 10. The motors 9 and 7 rotate in the same direction and in effect constitute a two speed motor.

From an alternator 11 main wires lead to points 12, 13 and 14. From the point 12 a wire 15 leads to the motor 9 and, in Fig. 1, another wire 16 leads to the motor 7. From the point 13 a wire 17 leads to a point 18 and thence to a switch contact 19 and another wire 20 leads to the pivoted end of a switch arm 21. From the point 14 a wire 22 leads to a switch contact 23 and another wire 24 leads to the pivoted end of a switch arm 25. From the point 18 a shunt wire 26 leads to a point 27 and thence to a switch contact 28.

A circuit closer 29 has switch arms 30, 31 and 32, connected by a link member pivoted to each arm but insulated from one another, that are adapted to make connection, as shown, with the contacts 19, 23 and 28, respectively, but tend to drop out of connection therewith until the arm 30 rests upon a pin 33. A solenoid 34 has the lower end of its core link connected with the arm 32 and, when its winding is energized, closes the arms 30, 31 and 32, as stated, but, upon being de-energized, allows the arms to drop out of connection. From the pivoted end of the arm 30 a wire 35 leads to the motor 9. From the pivoted end of the arm 31 a wire 36 leads to a point 37 and thence to the motor 9. From the pivoted end of the arm 32 a wire 38 leads to a point 39 and thence through the winding of a solenoid 40 to the point 37.

The solenoid 40 has the lower end of its core link connected to a lever 41, near to one end thereof; and this end of the lever is operatively connected with a dash pot 42, so that the upward movement of the core and the lever is always retarded by the action of the dash pot. From the slip rings of the motor 9 wires 43, 44 and 45 severally lead to the end contacts of three series of contacts 46, 47 and 48, respectively, each series of contacts being interconnected by intermediate resistances. A switch 49, with three arms radiating from a common center, is adapted to make connection with the contacts of the series of contacts 46, 47 and 48 and has an actuating arm with a pin at the outer end that engages with the longitudinally slotted other end of the lever 41. When the solenoid 40 is de-energized, the connected ends of the lever 41 and the switch 49 drop and the arms of the switch rotate counter clockwise until all the resistances between the series of contacts 46, 47 and 48 are in series with the switch, but, when the winding of the solenoid is energized, the connected ends of the lever and the switch are gradually lifted, in opposition to the dash pot 42, so that the three arms rotate clockwise and make contact with the contacts of the three series of contacts, cutting out intermediate resistances simultaneously, until finally all the resistances are cut out and a full current is free to pass through the secondary of the motor 9. The parts 40, 41, 42, 46, 47, 48 and 49 constitute one form of automatic starter for slip ring motors, but I am not limited to any particular type of starter.

A circuit closer 50 has the switch arms 21 and 25, connected by a link member pivoted to each arm but insulated from each other, that are adapted to make connection with switch contacts 51 and 52, respectively, but tend to drop out of connection therewith until the arm 21 rests upon a pin 53, as shown. In Fig. 1, from the contact 51 a wire 54 leads to the motor 7 and from the contact 52 a wire 55 leads to a point 56 and thence to the motor 7. A solenoid 57 has the lower end of its core link connected with the arm 25 and, when its winding is energized, closes the arms 21 and 25, as stated, but, upon being de-energized, allows the arms to drop out of connection.

In the alternative construction of Fig. 3, a two-speed three phase squirrel cage induction motor 58 replaces the motor 7; and wires 16$^a$, 54$^a$ and 55$^a$, leading from the same points as do the wires 16, 54 and 55 in Fig. 1, lead to the pivoted ends of a three member manually operated line switch 59, that is adapted, through suitable contacts, either to make connection, as shown, with wires 16$^b$, 54$^b$ and 55$^b$, leading to one of the primary windings of the motor 58, or to make connection with wires 16$^c$, 54$^c$ and 55$^c$, leading to the other primary winding of the same motor.

A connecting rod 60 connects the crank 2 with the rod 61 of a piston 62 that reciprocates in a horizontal compressor cylinder 63. The piston 62 is shown in a position at the end of a stroke in a direction away from the shaft 1; a discharge valve 64, at one end of the cylinder 63, in advance of the piston, is still open; a discharge valve 65, at the other end of the cylinder, is closed; a suction valve 66, at the same end as the valve 64, is closed; and a suction valve 67, at the other end of the cylinder, is open. A connecting rod 68 connects the crank 3 with the rod 69 of a piston 70 that reciprocates in a second horizontal compressor cylinder 71. The piston 70 is shown in a position at midstroke in a direction toward the shaft 1, being thus a quarter stroke in advance of the piston 62; a discharge valve 72, at one end of the cylinder 71, in advance of the piston, is open; a discharge valve 73, at the other end of the cylinder, is closed; a suction valve 74, at the same end as the valve 72, is closed; and a suction valve 75, at the other end of the cylinder, is open. The spaces outside of the cylindrical walls immediately adjacent to the pistons 62 and 70 are for the flow therethrough of cooling water, according to the usual practice. The parts 60 to 75 inclusive constitute one form of horizontal two cylinder double acting compressor, diagrammatically represented; but I am not limited to any particular type of compressor.

From the under part of a condenser 76 a header pipe 77 leads to a plurality of feed pipes 78, 79 and 80, leading into the upper parts of compartments 81, 82 and 83, arranged in parallel. The pipe 78 leads to an automatic expansion valve 84, which may be of the construction shown in Patent No. 1,137,051, issued to me on Apr. 27, 1915. The compartment 81 is provided with a master expansion chamber 85, in the form of a coil, leading from the valve 84 and provided with a pressure gage 86 near the inlet end. The pipe 79 leads to a valve casing 87. From the casing 87 a short pipe leads to an automatic expansion valve 88, similar to the valve 84. The compartment 82 is provided with an expansion chamber 89, leading from the valve 88, provided with a pressure gage 90 near the inlet end and having a capacity for refrigerating its containing compartment and any material therein proportionately greater than the capacity of the chamber 85. The pipe 80 leads to a valve casing 91, similar to the casing 87. From the casing 91 a short pipe leads to an automatic expansion valve 92, similar to the valve 88. The compartment 83 is provided with an expansion chamber 93, leading from the valve 86, provided with a pressure gage 94 near the inlet end and having a capacity for refrigerating its containing compartment and any material therein; proportionately greater than the capacity of the chamber 85. In actual operation, as will appear, the short pipes leading from the casings 87 and 91 are part of the expansion chambers 89 and 93, respectively. From the ends of the expansion chambers 85, 89 and 93, terminating outside of the compartments 81, 82 and 83, respectively, a suction pipe 95 leads to a T 96; from the T a branch pipe 97 leads to the inlet of the compressor cylinder, so as to discharge into passages leading to the valves 66 and 67; and from the T another suction pipe 98 leads to the inlet of the compressor cylinder 71, so as to discharge into passages leading to the valves 74 and 75. The pipe 98 is provided with a hand valve 99 by means of which the compressor cylinder 71 may be entirely shut off, thus diminishing the compressing capacity by one half. But as the rod 69 and the piston 70 would still continue to reciprocate and to cause friction losses, such a method of controlling the capacity of the apparatus is not especially economical.

Within the casing 87, as shown in Fig. 6, is a valve seat adapted to be closed from beneath by a valve 100, the valve stem extending upward through the seat. A flanged top 101 surrounds the upper part of the stem of the valve 100 and is screwed to a threaded opening in the upper part of the casing 87. A disc 102 is detachably secured to the upper end of the stem of the valve 100 and is adapted to reciprocate a short distance in a shallow chamber within the flange of the top 101 sufficiently to permit of the opening and closing of the valve 100. Within the top 101, at its axial center and below its shallow chamber, is a vertical chamber containing a compression spring 103 that bears upward upon the disc 102 so as to tend to close the valve 100.

A diaphragm 104, preferably of vanadium steel, encloses the top 101 and at its center rests upon the disc 102. A tubular casing 105, suitably supported, is spaced away from the wall of the compartment 82 and is enclosed at the top by a head 106, having a central vertical charging passage therethrough and a smaller transmitting passage extending upward and then to the left through an extension of the head. A transmitting pipe 107 is secured at one end to the extension of the head 106 and at its other end to the upper end of a flanged casing 108, having an axial opening therethrough. The casing 108 encloses the diaphragm 104; and the casing and the head 101, bolted together, clamp between them the circumference of the diaphragm. A flanged extension 109, secured to the lower end of the casing 105, and a flanged casing 110 are bolted together so as to clamp between them the circumference of a thin metal diaphragm 111. Within the casing 110 is a foot 112, having a threaded axial opening therethrough and having a flange secured to and bearing upward upon the center of the diaphragm 111. A regulating screw 113 is provided at the lower end, near the head, with right hand threads, of slight pitch, and at the upper end is of reduced diameter and is there provided with left hand threads, of greater pitch. The left hand threads of the screw 113 screw up and down within the opening of the foot 112 and the right hand threads screw up and down in a threaded opening in the axial center of the casing 110. A flanged extension 114, having a charging passage in axial alinement with the passage of the head 106, is concaved above its own passage and is internally threaded at the top. A thin metal relief diaphragm 115 is over the concave part of the extension 114. A flanged stem 116 has its flange bearing downward upon the center of the diaphragm 115 and is surrounded above its flange by a compression spring 117, that is stronger than the spring 103. A flanged clamping member 118 at its flange screws into the threaded top of the extension 114 so as to clamp the circumference of the diaphragm 115, loosely surrounds the spring 117 and the flange of the stem 116 and is internally threaded at the top. A head 119 screws into the threaded top of the member 118, surrounds the upper part of the spring 117, bears upon the top of the spring and has a vertical axial opening at the top through which the upper part of the stem 116 may reciprocate. Before the diaphragm 115 is clamped in position, some non-freezing liquid of a high coefficient of expansion, such as benzene or alcohol, which may be called the thermostatic fluid, is introduced through the charging passages of the parts 114 and 106 so as to fill the tube 105, the pipe 107 and the space above the diaphragm 104. The parts 102—119 and the contained liquid therein constitute one form of refrigerator thermostat 120 and within the compartment 83 is a thermostat 121 cooperating with a valve in the casing 91 similar to the valve 100.

The condenser 76 has a line of water piping 122, leading downward from a point above the condenser into the lower part thereof, emerging from its upper part and discharging therefrom, as preferred, either to the waste or to the water jacket of the compressor. A discharge pipe 123, opening from passages leading from the outlet sides of the valves 64 and 65 and another discharge pipe 124, opening from passages leading from the outlet sides of the valves 72 and 73, lead to a T 125 and from the T a pipe 126, provided near its further end with a T 127, leads into the top of the condenser 76. Connecting with the top of the condenser 76 are a high pressure gage 128 and an automatic relief valve 129, set to discharge, for ammonia, say at some such pressure as 250 pounds. From the T 127 a pipe 130 leads into the lower end of a flanged casing 131, closed by a diaphragm 132, preferably of thin vanadium steel, and provided near its axial center with stops 133, to prevent an excessive downward movement of the diaphragm. As more broadly used herein, the term "condenser" applies, not merely to the element 76, but to the entire high pressure side of the apparatus between the valves 64, 65, 72 and 73, at one end, and the valves 84, 88 and 92, at the other end, it being also understood that the valves within the casings 87 and 91 sometimes terminate the high pressure side at those casings.

A pipe 134 leads into the lower left side of a reservoir casing 135 and from the lower right side of the casing a smaller horizontal pipe 136 leads into the left side of an angle casing 137, provided with a vertical valve seat and discharging downward into the top of the piping 122. Surrounding and covering an opening in the top of the casing 135 is an expanding and contracting cylindrical bellows 138, with an undulated or zigzagged circumferential side wall and a flat head. The bellows 138 may be of brass or copper, or it may be of vanadium steel, copper plated or sheradized or otherwise protected against corrosion; and, if so constructed, it freely moves up and down in response to pressure changes. The casing 135 should be of sufficient capacity to provide a flow of cooling water to the condenser between the time when the power is shut off and the time when the compressor slows down to rest.

A clapper valve 139 is secured at the top within the casing 137 to the front end of a shaft 140, that extends through the back wall of the casing, and is adapted to close the valve seat within the casing. Secured to the rear and outside end of the shaft 140 is a short lever 141, extending horizontally to the right. A light compression spring 142 at its lower end bears upon a bracket projecting to the right from the casing 137 and at the top bears upward against the under side of the outer end of the lever 141. A headed bolt 143 is adapted to be screwed up or down in a threaded vertical opening through the lever 141 and is secured in any desired vertical position by a lock nut 144. The tendency of the spring 142 is to press upward upon the lever 141 so as fully to open the valve 139. When the valve 139 is fully open, there is a maximum flow of water permissible through the casing 137. But, upon a pressing down of the bolt 143 the valve 139 begins to close, and, if fully closed, it prevents any flow through the casing 137.

The diaphragm 132 near its circumference rests upon a ring at the top of the casing 131 and at its circumference rests upon an annular gasket 145, preferably of soft lead, just outside the ring. When the parts are assembled and the valve 139 is closed, the lowest position of the diaphragm 132 is just above the stops 133. An upper casing 146 has a flange whereby it is bolted to the flange of the casing 131 so as to clamp the gasket 145 and the edge of the diaphragm 132; it has in its under side a shallow chamber of equal diameter with the chamber in the top of the casing 131; it has at its axial center a cylindrical chamber extending upward from the shallow chamber nearly to the top; it has a small threaded passage at its axial center extending through the top; and it has a space at the lower right side of the cylindrical chamber from which a horizontal shaft passage extends through the rear wall. A reciprocating member 147 has a flange at the lower end resting upon the center of the diaphragm 132 and of a diameter greater than that of the stops 133; above its flange it is adapted to reciprocate within the lower end of the cylindrical chamber in the casing 146; and it has in the part so reciprocating a transverse recess extending from left to right. The upward movement of the member 147 would be limited, in case of an extremely high pressure on the under side of the diaphragm 132, by its flange striking the wall of the casing 146 around the lower end of the cylindrical chamber therein. A heavy compression spring 148 occupies the upper end of the cylindrical chamber in the casing 146 and it bears, at the lower end, upon the top of the member 147 and, at the upper end, upon the head of a threaded bolt 149 passing upward through a threaded opening in the top of the casing 146. The outer end of the bolt 149 has a square wrench section whereby it may be turned up or down and it is held in any desired position by a lock nut 150 just above the top of the casing. It is evident that, upon loosening the nut 150, the bolt 149 may be screwed downward so as to increase the thrust of the spring 148, or it may be screwed upward so as to decrease the thrust. A rock shaft 151 is journaled at its rear end in a proper support; it passes though the rear wall of the casing 146; and it has secured to its front end within the casing a short lever 152. A slide block 153 reciprocates slightly in the recess of the member 146 and has a more than semi-cylindrical recess, extending from front to back, in which rests the more than semi-cylindrical other end of the lever 152. A long lever 154 is secured to the outer part of the shaft 151 and at its free end bears upon the head of the bolt 143. A pin 155 projects horizontally frontward from the free end of the lever 154.

Secured at its lower end to the head of the bellows 138 is a rod 156, adapted to reciprocate in a stationary and suitably supported guide 157 and carrying above its insulated top a leaf switch 158. A helical compression spring 159 surrounds the rod 156, at its upper end bears upon the under side of the guide 157 and at its lower end bears upon the upper side of a collar 160 that is free to slide up or down along the rod. A lighter helical compression spring 161 also surrounds the rod 156, at its upper end bears upon the under side of the collar 160 and at its lower end bears upon the upper side of a collar 162 that is secured to the rod. The springs 159 and 161, especially the latter, tend to lower the switch 158 into an open position, as will be explained, but they yield to greater pressure, exerted upward within the bellows 138 so as to close the switch. The spring 159 acts as a buffer and the major part of the movement of the switch 158 is effected by or in opposition to the spring 161. From the point 27 a wire 163 leads to an insulated and supported contact 164 and from a similar insulated and supported contact 165 a wire 166 leads to an insulated and supported pivot post 167. The switch 158 is adapted to open or to close the contacts 164 and 165. From an insulated and supported split contact post 168 a wire leads to the pivoted end of a hand switch 169. A switch arm 170 is pivoted to the lower end of the post 167; it is adapted, as shown, when elevated to make sliding contact within the split parts at the lower end of the post 168; it has an insulated section just to the right of the latter post; it has a catch at its right end; and it has a depending handle near its right end. An angle bracket 171 is properly supported to the right of the post 168 and has pivoted thereto a bell crank lever 172, which tends to rotate clockwise by the action of a flat spring 173 that is secured to the bracket. The lever 172 has a horizontal arm extending to the right and positioned so that its right end is in the path of the pin 155 upon a sufficient ascent of the lever 154; it has a depending vertical arm with a catch on the left side at the lower end adapted to engage the right end of the arm 170 and to hold it in contact with the post 168, as shown; and it has to the left above the arm a projecting finger adapted to bear down upon the arm 170 when the parts 154 and 155 are sufficiently lifted. When the lever 172 is rotated counter-clockwise, in opposition to the spring 173, the arm 170 is disengaged and, under force of gravity assisted by the finger of the lever, it drops out of contact with the post 168, thus opening the switch, but it is stopped from dropping too far by a pin 174.

The switch 169 is adapted to make contact with a contact 175, as shown, or, on being turned to the left, with a contact 176, or, on being turned to the right, with a contact 177. From the contact 176 a wire 178 leads to a point 179, thence through the winding of the solenoid 34 to a point 180 and thence to the point 39. From the contact 177 a wire 181 leads to a point 182 and thence through the winding of the solenoid 57 to the point 56. From the contact 175 a wire 183 leads to a point 184, thence to a point 185 and thence through the wall of the compartment 81 to the fixed end of the switch 186 of a master thermostat, to be described.

The master thermostat, of which the switch 186 is a part, has, as the basis of its construction, an ordinary Bourdon tube pressure gage, such as the gage 128, adapted to indicate the pressures either of ammonia or of sulphur dioxide, as may be preferred. A short cylinder 187 is to be understood as being connected with the fixed end of the Bourdon tube and to contain a little liquid ammonia or sulphur dioxide, as the case may be, so that upon a rise of temperature in the cylinder and of vapor pressure in the tube, by means of the familiar mechanism employed in such gages, the free end of the tube will rotate clockwise a shaft 188, to which the switch 186 is secured, and, upon a fall of such temperature and pressure, the free end will rotate the shaft counter-clockwise. The switch 186 is insulated from the shaft 188 and is positioned in front of an insulating face plate 189. The plate 189 has, arranged in a circle near its circumference, screw holes, a short distance apart and extending a part way through the plate. A long arc shaped high temperature starting contact 190 is detachably secured to the plate 189, on the right hand side, by screws extending into certain holes of the plate. A comparatively short arc shaped piece, in a similar manner, is detachably secured to the plate 189, on the left; at the top it consists of a narrow low speed contact 191; and, for most of its length, it consists of a low temperature stopping contact 192, insulated from the contact 191 by a narrow piece of insulating material. The free end of the switch 186 is shown in contact with the contact 190.

From the contact 190 a wire 193 leads to a point 194 and thence to the fixed end of a spring circuit closer 195; and from the point 194 a wire 196 leads to the fixed end of a spring circuit closer 197. From the contact 191 a wire 198 leads to the pivoted end of a hand switch 199 shown to be in contact with a contact 200; and from the contact 200 a wire 201 leads to the fixed end of a spring circuit closer 202. From the contact 192 a wire 203 leads to the fixed end of a spring circuit closer 204.

A double end solenoid core 205 carries between its ends a curved cross piece with a contact face 206 at the upper end and a contact face 207 at the lower end and it has a longitudinal slot at the right of the cross piece. From a contact 208 a wire 209 leads to and from the winding of a solenoid 210, that surrounds the left end of the core 205, to a point 211 and thence to the point 180. From a contact 212 a wire 213 leads to and from the winding of a solenoid 214, that surrounds the right end of the core 205, to a point 215 and thence to the point 56. A switch arm 216, near its lower end, is pivoted on a pivot 217 that extends through the slot of the core 205; below the pivot it has a contact section 218 adapted to make sliding contact with the contact face 207; above the pivot it has a contact section 219 adapted to make sliding contact, as shown, with the contact face 206; and at the extreme top it has a longitudinal slot. From the point 184 a loose wire 220 leads to the contact section 218 and from the contact face 207 a loose wire 221 leads to the point 182. From the point 185 a loose wire 222 leads to the contact section 219 and from the contact face 206 a loose wire 223 leads to the point 179. A double end solenoid core 224 has a pin 225 extending frontward through the slot of the arm 216. From a contact 226 a wire 227 leads to and from the winding of a solenoid 228, that surrounds the left end of the core 224, to the point 211. From a contact 229 a wire 230 leads to and from the winding of a solenoid 231, that surrounds the right end of the core 224, to the point 215. The spring circuit closers 195, 202, 204 and 197 tend to close the contacts 226, 229, 208 and 212, respectively; but when the core 224 is moved to the left, upon an energization of the winding of the solenoid 228, it opens the circuit closer 195; when the core 224 is moved to the right, upon an energization of the winding of the core 231, it opens the circuit closer 202; when the core 205 is moved to the left, upon the energization of the winding of the solenoid 210, it opens the circuit closer 204; and when the core 205 is moved to the right, upon the energization of the winding of the solenoid 214, it opens the circuit closer 197. After each movement, upon the energization of a solenoid, of the cores 224 and 205, respectively, the core, by reason of friction and the weight of the moving parts, remains in the position into which it has been moved, whether to the left or right, until the energization of the solenoid, provided for that purpose, moves the core into the opposite position. With the core 205 in the position shown, a movement of the core 224 to the left, by means of the pin 225, rotates the arm 216 to the left so that the contact section 219 becomes in contact with the contact face 206, as shown, and a movement of the core 224 to the right, by the same means, rotates the arm to the right so that the contact section 218 becomes in contact with the contact face 207. But when the core 205 is moved to the left, the contact faces 206 and 207 are entirely out of contact with the contact sections 219 and 218. From the wire 163 a short wire leads to a contact 232 and from a contact 233 a wire leads to a point 234. The contacts 232 and 233 are supported by but are insulated from the guide 157. When the switch 158, under the action of the springs 159 and 161, assisted by gravity, is opened in relation to the contacts 164 and 165, it connects the contacts 232 and 233. From the pin 174 a wire 235 leads to the point 234 and thence to the fixed end of the circuit closer 204.

Next considering the construction of Figs. 7 and 8: Here, as elsewhere herein, parts so similar to parts already described as not to require further description are indicated by a number followed by a letter. The switch arm 216ª has contact sections 219 and 218, but it terminates just above the former section, and, instead of being pivoted, it is secured, midway between its ends, to the front end of a shaft 236, journaled in a support 237. The core 224ª and the solenoids 228 and 231 are positioned in the rear of the core 205 and are not so far above the solenoids 210 and 214 as in the former construction. An actuating arm 216ᵇ, longitudinally slotted at the upper end, the pin 225 passing through the slot, has its lower end secured to the rear end of the shaft 236. The advantages of this construction over that of Fig. 1 is that the core 224ª is shorter than the core 224, the solenoids 228 and 231 are nearer together and a less movement of the core 224ª is effective in actuating the arm 216ᵇ.

Next considering the construction of Fig. 9: A stationary bed plate 238 has rails 239 and 240 extending for its entire length near to the edge of each side and a movable bed plate 241 on the under side registers with the rails, so that, by turning the head of a threaded bolt 242, extending through a threaded opening in a projection 243 rising upward from the left end of the plate 238 and secured at the right end to a similar projection 244 rising upward from the left end of the plate 241, the plate 241 may be moved a short distance to the left and then back to the original position, as shown. The motors 9 and 58 are adapted to rotate a common shaft 8ª; but, instead of a speed reducer being employed, the shaft has near the right end a pinion 245 and a little further to the right a pinion 246 of twice the diameter of the former pinion and at the right end it is journaled in a support 247. The shaft 1ª, at the left of the crank 2, carries a gear 248, of a diameter three times the diameter of the pinion 246 and adapted to mesh therewith, as shown; it also carries, to the left of the gear 248, a gear 249, having a diameter of the ratio of thirteen to one as compared with the diameter of the pinion 245 and adapted to mesh therewith; and at the left end it is journaled in a support 250. The gears 248 and 249 are spaced further apart than are the pinions 246 and 245. When the plate 241 is moved to the left, the power being shut off from the motors 9 and 58, first the pinion 246 is disengaged from the gear 248 and then the pinion 245 meshes with the gear 249; and when the plate is moved back to its original position, as shown, first the pinion 245 is disengaged from the gear 249 and then the pinion 246 meshes with the gear 248.

Finally considering the construction of Figs. 10 and 11: A bracket 251 at the top supports an insulated contact 252 projecting frontward therefrom and at the left supports a similar insulated contact 253 projecting frontward therefrom. From the contact 252 a wire leads to the pivoted end of the hand switch 169 and from the contact 253 the wire 235 leads to the point 234 and thence to the fixed end of the circuit closer 204. A rock shaft 254 is journaled in an opening through the bracket 251, but is insulated therefrom, and carries at the end in front of the bracket a contact arm 255, normally in a position of sliding contact with the contact 252. Secured to but insulated from the bracket 251 is a spring contact 256, operative to keep in contact with the arm 255 in whatever position the latter may be. The wire 166 connects the contacts 165 and 256. Secured to the end of the shaft 254 back of the bracket 251 is a weight arm ending in a globular weight 257 at the top and having projecting to the right of the shaft an upper limit arm 258 and a lower limit arm 259. The parts are to be understood to be so positioned that on a sufficient ascent of the lever 154 the pin 155 will engage the arm 258, in a manner similar to that already described in reference to the lever 172, and on a descent of the lever 154 the pin will engage the arm 259. A pin 260 projects from the back of the bracket 251, and when the weight 257 is to the right of the vertical center of the shaft 254, as shown, with the arm 255 in contact with the contact 252, the pin prevents the weight from falling further to the right. Another pin 261 also projects from the back of the bracket 251, at a position to the left of the pin 260, and prevents the weight 257 from falling too far to the left. When the pin 261 stops the weight 257, the arm 255 is in contact with the contact 253.

The method of operation is as follows: Except where the construction of other figures is expressly specified, it is to be understood that the construction under consideration is that disclosed in Figs. 1, 2, 4, 5 and 6. Assume that the motor 9 is of 100 H. P. and has a speed under full load of 1760 R. P. M.; that the motor 7 has a speed of 285 R. P. M.; and that the reducer 6 reduces the speed of the shaft 1 in the ratio of 5.5 to 1. Then when the motor 9 is rotated, the compressor has a speed of 320 R. P. M.; and when the motor 7 is rotated, the compressor has a speed of 52 R. P. M.

With the parts in the positions shown, a branch current is passing from the point 27 through the parts 163, 164, 158, 165, 166, 167, 170, 168, 169, 175, 183, 184, 185, 222, 219, 206, 223, 179, 34, 180, 39, 38, 40 and 37 so as to keep the circuit closer 29 closed and the resistances between the contacts 46, 47 and 48 cut out. Consequently the motor 9 is running at full speed and the compressor is operating at 320 R. P. M. Liquid ammonia is passing from the pipe 78 and is expanding in the chamber 85 so as to refrigerate the compartment 81, it is also passing from the pipe 79 and is expanding in the chamber 89 so as to refrigerate the compartment 82 and it is passing from the pipe 80 and is expanding in the chamber 93 so as to refrigerate the compartment 83. The expanded ammonia is forced through the pipe 95, the T 96, the pipes 97 and 98 and the valves 66, 67, 74 and 75 so as to be compressed by the pistons 62 and 70. The compressed ammonia is forced through the valves 64, 65, 72 and 73, the pipes 123 and 124, the T 125, the pipe 126 and the T 127 into the condenser 76, where it is cooled and liquefied by the pressure and by a flow of water from the pipe 134 through the casing 135, the pipe 136, the casing 137 and the pipe 122.

As the head pressure tends to rise, the pressure of the ammonia passing through the pipe 130 tends to force the diaphragm 132 upward so as to lift the lever 154 in opposition to the spring 148. Consequently the spring 142 tends to open more widely the valve 139. As more water flows through the pipe 122, the head pressure tends to fall and the force of the spring 148, in opposition to the spring 142, tends to close the valve 139. An equilibrium is thus established, so that the head pressure, as indicated by the gage 128, normally remains constant. The primary adjustment of the thrust of the spring 148 is made by the bolt 149 and any slight adjustment to affect the flow of water is effected by adjusting the nut 144. The pressure of water against the valve 139 assists the action of the spring 142. The automatic control of the flow of condensing water according to the conditions of the head pressure is especially desirable where, as here, the weight of ammonia being compressed per unit of time is subject to great and sudden variations.

The pressure, as indicated by the gage 86, and consequently the temperature in the chamber 85 is determined by the adjustment of the valve 84. The pressure, as indicated by the gage 90, and consequently the temperature in the chamber 89 is determined by the adjustments of the valve 88 and the thermostat 120. The temperature effect of adjusting an expansion valve is well known. And at the beginning of a refrigeration period as much ammonia passes into the chamber 89 as the valve 88 permits. But as the temperature in the compartment 82 tends to fall toward some predetermined low limit, say 35 deg. F., the thermostatic fluid contracts sufficiently to permit the spring 103 partially to close the valve 100 and to check the flow of liquid ammonia through the casing 87, until eventually the valve 100 acts as an expansion valve, with the result that the expansion in the chamber 89 is so far checked as to prevent any further fall of temperature in the compartment. In other words, the thermostat prevents the compartment 82 from getting too cold. Similar observations apply to the elements 91, 92, 93 and 94 in the compartment 83. It is apparent that any number of expansion chambers, either one or a plurality being in one compartment, may be arranged in parallel. Automatic expansion valves, such as the valves 84, 88 and 82 prevent overfeeding, that might even result in liquid passing over into the compressor. Such a result, in the ordinary non-automatic construction, may occur if the expansion coil is relatively short. On the other hand, the thermostats 120 and 121 permit a full feed to the valves 88 and 92 so long as the chambers 89 and 93 are warm and begin to be effective only after the heat transfer into the chambers has slackened considerably. Hence the chambers 89 and 93 do not at any time deliver superheated gas to the compressor. Moreover, one or more subordinate expansion chambers, each controlled by a thermostat, such as the thermostat 120, in parallel with a master expansion chamber, such as the chamber 85, and with the lengths and diameters of the chambers properly proportioned, neutralize any tendency at any time of the latter chamber to discharge superheated gas into the compressor.

With a fall of temperature in the compartment 81 to a limit say of 34 deg. F., the switch 186 makes contact with the contact 191. Thereupon an instantaneous branch current passes from the point 185 through the parts 183, 186, 191, 198, 199, 200, 201, 202, 229, 230, 231, 215 and 213 to the point 56. The energization of the solenoid 231 throws the arm 216 to the right so as to break the connection between the section 219 and the face 206 and to make a connection between the section 218 and the face 207. Thereupon the circuit closer 29 opens, the resistances between the contacts 46, 47 and 48 are thrown in and the motor 9 no longer operates. But a branch current now passes from the point 184 through the parts 218, 207, 221, 182 and 57 to the point 56. The energization of the solenoid 57 closes the circuit closer 50 so that the motor 7 rotates the shaft 8 at 285 R. P. M. and the compressor at 52 R. P. M. Consequently less refrigeration is now being effected in the compartments 81, 82 and 83.

The ideal condition is one such that the apparatus is so proportioned to the duty requirements that, when the motor 7 is operating, the temperature in the compartment 81 will begin to rise. First assume that there is such a proportioning. Then when the temperature in the compartment 81 rises say to 38 deg. F., the switch 186 makes contact with the contact 190. Thereupon an instantaneous branch current passes from the point 185 through the parts 183, 186, 190, 193, 194, 195, 226, 227, 228, 211, 180, 39 and 40 to the point 37. The energization of the solenoid 228 throws the arm 224 back to the left, as shown, so as to break the connection between the section 218 and the face 207 and to make a connection between the section 219 and the face 206. Thereupon the circuit closer 50 opens and the motor 7 no longer operates. But a branch current now passes, as first described, through the parts included in circuit with the parts 219 and 206 so as to energize the solenoids 34 and 40, to close the circuit closer 29, to cut out the resistances between the contacts 46, 47 and 48 and to operate the motor 9, as before. As already stated, the ideal condition is one where the operation of the compressor varies between full speed and low speed without coming to a stop. For then there is no loss of power at starting up from a dead stop and there can be no accumulation of high pressure vapor in the expansion chambers that has to be pumped down before a new refrigerating effect can be begun.

But suppose that with the motor 7 operating the temperature in the compartment 81 still continues to fall. Then at some predetermined low temperature limit, say 33 deg. F., the switch 186 makes contact with the contact 192. Thereupon an instantaneous branch current passes from the point 185 through the parts 183, 186, 192, 203, 204, 208, 209, 210, 211, 180, 39 and 40 to the point 37. The energization of the solenoid 210 moves the core 205 to the left so as to break the connection between the section 218 and the face 207. Thereupon the circuit closer 50 opens and the motor 7 no longer operates. As the temperature in the compartment 81 thereupon gradually rises, the switch 186 makes a contact with the contact 191 that is inoperative, for the reason that the circuit closer 202 is open. But with a further rise of temperature to 38 deg. F., the switch 186 makes contact with the contact 190 so as to throw the arm 216 to the left as has already been described. But now, also, an instantaneous branch current passes from the point 194 through the parts 196, 197, 212, 213, 214 and 215 to the point 56 so as to energize the solenoid 214 and to move the core 205 to the right, as shown. Thereupon the section 219 and the face 206 are in contact and the motor 9 starts up and runs at full speed as has already been described. The normal cycle of operation is now complete.

The advantages of the construction whereby the motor 7 is operated only upon a fall of temperature after the motor 9 has operated, and not also on a rise of temperature before the motor 9 operates, are two. First, the starting up of a squirrel cage motor, such as the motor 7, if of 10 H. P. or upwards, from a dead stop against a heavy load, such as occurs in refrigeration practice, is objectionable, and hence there would be necessitated, in the present construction, the substitution of another slip ring motor with an automatic starter. Second, as a reason of more general application, it may happen when the compressor is standing idle, after the compartment 81 has been cooled down to 33 deg. F., that much warm material is introduced into the compartment; and under such circumstances, the compressor should operate at full capacity until the temperature has been greatly reduced.

It sometimes happens that there is a partial or total failure of the supply of condensing water entering the pipe 134, so that the pressure upward against the head of the bellows 138 is no longer able to overcome the thrust of the spring 161. In such a case, the switch 158 opens and the current through the solenoid 34 or the solenoid 57, as the case may be, is interrupted so as to stop the motor 9 or the motor 7, as the case may be. Furthermore, when the switch 158 drops so as to connect the contacts 232 and 233, an instantaneous branch current passes from the point 27 through the parts 163, 232, 158, 233, 234, 235, 204, 208, 209, 210, 211, 180, 39 and 40 to the point 37 so as to energize the winding 210 and to move the core 205 to the left. Consequently, upon a resumption of the full flow of condensing and the resulting upward pressure, when the switch 158 again closes the contacts 164 and 165, the motor 9 must first operate, before, by any chance, the motor 7 can operate. The advantages of this construction are the same as in the case, already considered, where the compressor starts up from a dead stop. And sometimes it may happen, owing to non-condensable gases being in the system or from the condenser being too small or ill designed, that the maximum flow of cooling water is insufficient to maintain a normal head pressure. In such a case, the lever 154 ascends until the pin 155 trips the lever 172 so as to open the switch arm 170. Here again the current through the solenoid 34 or the solenoid 57, as the case may be, is interrupted so as to stop the motor 9 or the motor 7, as the case may be. And when the arm 170 drops so as to make contact with the pin 174, an instantaneous branch current passes from the point 27 through the parts 163, 164, 158, 165, 166, 167, 170, 174, 234, 235, 204, 208, 209, 210, 211, 180, 39 and 40 to the point 37 so as to energize the winding 210 and to move the core 205 to the left. Consequently when the arm 170 is subsequently closed by hand, the motor 9 must first operate, before, by any chance, the motor 7 can operate. The advantages of this construction are the same as in the last case.

The method of normally controlling the starting of the compressor as above described is subject to several variations. If the switch 199 is opened, the switch arm 216 becomes permanently positioned to the left, as shown, and the section 219 becomes, in effect, a stationary contact. Accordingly the switch 186 at a high temperaure limit makes contact with the contact 190 to start and operate the motor 9 and at a low temperature limit makes contact with the contact 192 to stop the motor; and the motor 7 is not operated at all. Furthermore the apparatus may be manually controlled in several ways. By using the switch 169 to make and break contact with the contact 176 exclusively, the motor 9 is started and stopped successively. By using the switch 169 to make and break contact with the contact 177 exclusively, the motor 7 is started and stopped successively. But in case the motor 7 is of 10 H. P. or over, such a method of control is objectionable on account of the excessive current drawn from the electric mains at starting. But by using the switch 169 to make contact with the contact 176 so as to start and operate the motor 9 until speeded up and then immediately turning the switch into contact with the contact 177, so that the motor 9 ceases to operate and the motor 7 receives a current while rotating, there is no such excessive drain from the mains. Moreover, if the cylinder 187 be left unsupplied with ammonia or other vapor, the switch 186 can be manually operated with precisely the same effect, in the operation of the compressor as when the apparatus is thermostatically controlled.

In the alternative construction of Fig. 3, suppose that the motor 58 has a speed, when the switch 59 is in connection with the wires 16$^b$, 54$^b$ and 55$^b$, of 430 R. P. M.; and that it has a speed, when the switch is in connection with the wires 16$^c$, 54$^c$ and 55$^c$ of 215 R. P. M. Obviously the switch 59 should be shifted only at a time when no current is passing to the motor 58. By the first connection of the switch 58, the compressor will run at about 80 R. P. M.; and by the second connection, at about 40 R. P. M. This means of changing the minimum speed limit of the compressor is of advantage under some conditions.

In the alternative construction of Figs. 7 and 8, the slight and obvious differences of operation have already been indicated.

In the alternative construction of Fig. 9, with the parts in the position shown, when the motor 9 is operating at 1760 R. P. M., the compressor runs at 587 R. P. M.; when the higher speed part of the motor 58 is operating at 430 R. P. M., the compressor runs at 143 R. P. M.; and when the lower speed part of the motor 58 is operating at 215 R. P. M., the compressor runs at 72 R. P. M. But when the pinion 245 meshes with the gear 249, when the motor 9 is operating at 1760 R. P. M., the compressor runs at 135 R. P. M.; when the higher speed part of the motor 58 is operating at 430 R. P. M., the compressor runs at 33 R. P. M.; and when the lower speed part of the motor 7 is operating at 215 R. P. M., the compressor runs at 17 R. P. M. This extreme flexibility of adjustment may be of advantage under some conditions.

In the alternative construction of Figs. 10 and 11, in case of an excessive head pressure that cannot be controlled by the maximum flow of condensing water, the pin 155, upon the ascent of the lever 154, actuates the arm 258 so as to throw the weight 257 to the left and to break the current through the solenoid 34 or the solenoid 57, as the case may be, and to stop the motor 9 or the motor 7, as the case may be; and, also, as the arm 255 in falling makes contact with the contact 253, a current passes from the point 27 through the parts 163, 164, 158, 165, 166, 256, 255, 253, 235, 234, 204, 208, 209, 210, 211, 180, 39, 38 and 40 to the point 37 so as to energize the solenoid 210 and to move the core 205 to the left, with the same result as in the main construction. But here, on a drop of the head pressure toward normal, the pin 155 actuates the arm 259 so as to throw the weight 257 to the right and again to connect the arm 255 and the contact 252 and thereby to start up the compressor just as happens after an automatic closing of the switch 158.

What I have invented and what I desire to have protected by Letters Patent is expressed in claims as follows.

I claim:

1. In combination, a condenser, an expansion chamber leading therefrom, a compressor leading from the chamber into the condenser, alternating current actuated devices adapted to cause the operation of the compressor at different speeds, and means for transmitting current to the several devices successively.

2. In combination, a condenser, an expansion chamber leading therefrom, a compressor leading from the chamber into the condenser, alternating current actuated devices adapted to cause the operation of the compressor at different speeds, and means for transmitting current to the several devices successively in a predetermined order.

3. In combination, a condenser, an expansion chamber leading therefrom, a compressor leading from the chamber into the condenser, motors adapted for rotation at different speeds, means whereby the rotation of any one motor drives the compressor, and means for transmitting operative energy to the several motors successively.

4. In combination, a condenser, an expansion chamber leading therefrom, a compressor leading from the chamber into the condenser, motors adapted for rotation at different speeds, means whereby the rotation of any one motor drives the compressor, and means for transmitting operative energy to the several motors successively in a predetermined order.

5. In combination, a condenser, an expansion chamber leading therefrom, a compressor leading from the chamber into the condenser, alternating current actuated devices adapted to cause the operation of the compressor at different speeds, and means for transmitting current to the several devices successively but causing the transmission of current to a device causing such rotation at a high speed to precede such transmission to a device causing such rotation at a low speed.

6. In combination, a condenser, an expansion chamber leading therefrom, a compressor leading from the chamber into the condenser, a plurality of motors, means whereby the rotation of any one motor drives the compressor, and means for transmitting energy to the several motors successively but causing the transmission of such energy to a high speed motor to precede such transmission to a low speed motor.

7. In combination, a condenser, an expansion chamber leading therefrom, a compressor leading from the chamber into the condenser, a shaft, a slip ring induction motor device adapted to cause the rotation of the shaft at full speed, a squirrel cage induction motor device adapted to cause the rotation of the shaft at low speed, means whereby the rotation of the shaft drives the compressor, and means for transmitting current to the former device and cutting out the resistances thereof and for thereafter shutting off the current therefrom and turning on the current to the latter device.

8. In combination, a condenser, an expansion chamber leading therefrom, a compressor leading from the chamber into the condenser, a shaft, a slip ring induction motor device adapted to cause the rotation of the shaft at full speed, a squirrel cage induction motor device adapted to cause the rotation of the shaft at a plurality of lower speeds, means whereby the rotation of the shaft drives the compressor, means for turning on current to the former device and cutting out the resistances thereof and for thereafter shutting off the current therefrom and turning on current to the latter device, and means for adjusting the latter device so as to cause a rotation of the shaft at some one of the lower speeds.

9. In combination, a condenser, an expansion chamber leading therefrom, a compressor leading from the chamber into the condenser, a shaft, current actuated devices to cause the rotation of the shaft at different speeds, means whereby the rotation of the shaft drives the compressor, means for varying the ratio between the speeds of the shaft and the compressor, and means for transmitting current to the several devices successively.

10. In combination, a condenser, an expansion chamber leading therefrom, a compressor leading from the chamber into the condenser, a shaft, current actuated devices to cause the rotation of the shaft at different speeds, means whereby the rotation of the shaft drives the compressor, means for varying the ratio between the speeds of the shaft and the compressor, and means for transmitting current to the several devices sucessively in a predetermined order.

11. In combination, a condenser, an expansion chamber leading therefrom, a compressor leading from the chamber into the condenser, a shaft, current actuated devices to cause the rotation of the shaft at different speeds, means whereby the rotation of the shaft drives the compressor, means for varying the ratio between the speeds of the shaft and the compressor, and means for transmitting current to the several devices successively but causing the transmission to a device causing such rotation at a high speed to precede such transmission to a device causing such rotation at a low speed.

12. In an apparatus for the circulation of refrigerant including a compressor, a shaft, alternating current actuated devices adapted to cause the rotation of the shaft at different speeds, means whereby the rotation of the shaft drives the compressor, and means adapted to be affected by such circulation for transmitting current to the several devices successively but causing the transmission of current to a device causing such rotation at a high speed to occur at a high temperature limit and causing such transmission to a device causing such rotation at a low speed to occur at a lower temperature limit.

13. In an apparatus for the circulation of refrigerant including a compressor, a shaft, a slip ring induction motor device adapted to cause the rotation of the shaft at full speed, a squirrel cage induction motor device adapted to cause the rotation of the shaft at low speed, means whereby the rotation of the shaft drives the compressor, and means adapted to be affected by such circulation at a high temperature limit for turning on current to the former device and cutting out the resistances thereof, at an intermediate temperature limit for shutting off the current therefrom and turning on current to the latter device and at a low temperature limit for shutting off the current from the latter device.

14. In an apparatus for the circulation of refrigerant including a compressor, a shaft, a slip ring induction motor device adapted to cause the rotation of the shaft at full speed, a squirrel cage induction motor device adapted to cause the rotation of the shaft at a plurality of lower speeds, means whereby the rotation of the shaft drives the compressor, means adapted to be affected by such circulation at a high temperature limit for turning on current to the former device and cutting out the resistances thereof, at an intermediate temperature limit for shutting off the current therefrom and turning on current to the latter device and at a low temperature limit for shutting off the current from the latter device, and means for adjusting the latter device so as to permit a rotation of the shaft at some one of such lower speeds.

15. In an apparatus for the circulation of refrigerant including a compressor, driving means operated by alternating current for driving the compressor, and a thermostat adapted to be affected by such circulation for starting at a high temperature limit the operation of the driving means at full speed, for starting at an intermediate temperature limit its operation at low speed and for stopping it at a low temperature limit.

16. In an apparatus for the circulation of refrigerant including a compressor, a shaft, alternating current actuated devices adapted to cause the rotation of the shaft at different speeds, means whereby the rotation of the shaft drives the compressor, and a thermostat adapted to be affected by such circulation for transmitting current to the several devices successively but causing the transmission of current to a device causing such rotation at a high speed to occur at a high temperature limit and causing such transmission to a device causing such rotation at a low speed to occur at a lower temperature limit.

17. In an apparatus for the circulation of refrigerant including a compressor, a shaft, a slip ring induction motor device adapted to cause the rotation of the shaft at full speed, a squirrel cage induction motor device adapted to cause the rotation of the shaft at low speed, means whereby the rotation of the shaft drives the compressor, and a thermostat adapted to be affected by such circulation for turning on current at a high temperature limit to the former device and cutting out the resistances thereof, for shutting off the current therefrom at an intermediate temperature limit and turning on current to the latter device and for shutting off the current from the latter device at a low temperature limit.

18. In an apparatus for the circulation of refrigerant including a compressor, a shaft, a slip ring induction motor device adapted to cause the rotation of the shaft at full speed, a squirrel cage induction motor device adapted to cause the rotation of the shaft at a plurality of lower speeds, means whereby the rotation of the shaft drives the compressor, a thermostat adapted to be affected by such circulation for turning on current at a high temperature limit to the former device and cutting out the resistances thereof, for shutting off the current therefrom at an intermediate temperature limit and turning on current to the latter device and for shutting off the current from the latter device at a low temperature limit, and means for adjusting the latter device so as to permit a rotation of the shaft at some one of such lower speeds.

19. In combination, a condenser, a compressor leading into the condenser, multi-speed driving means for driving the compressor, and means interrupting the operation of the driving means in case of abnormal operating conditions and, after such interruption, preventing it from running at low speed until after it has been accelerated to run at full speed.

20. In combination, a condenser including water piping, a compressor leading into the condenser, multi-speed driving means for driving the compressor, and means interrupting the operation of the driving means in case of abnormal operating conditions in said piping and, after such interruption, preventing the driving means from running at low speed until after it has been accelerated to run at full speed.

21. In combination, a condenser, a compressor leading into the condenser, multi-speed driving means for driving the compressor, and means interrupting the operation of the driving means in case of excessive head pressure and, after such interruption, preventing it from running at low speed until after it has been accelerated to run at full speed.

22. In combination, a condenser including water piping, a compressor leading into the condenser, a slip ring induction motor for driving the compressor, and means dependent upon normal conditions of the water supply for said piping to permit the cutting out of the resistances of the motor and its running at full speed.

23. In an apparatus for the circulation of refrigerant including a compressor, a full speed switch contact, a low speed switch contact, a switch arm, and temperature controlled means for operating at a high temperature limit to close the arm with the former contact and to drive the compressor at full speed, for operating at an intermediate temperature limit to close the arm with the latter contact and to drive the compressor at low speed and for operating at a low temperature limit to break the connection between the arm and both contacts.

24. In an apparatus for the circulation of refrigerant including a compressor, a full speed switch contact, a low speed switch contact, a switch arm, temperature controlled means for operating at a high temperature limit to close the arm with the former contact and to drive the compressor at full speed, for operating at an intermediate temperature limit to close the arm with the latter contact and to drive the compressor at low speed and for operating at a low temperature limit to break the connection between the arm and both contacts, and means interrupting the operation of the compressor in case of abnormal operating conditions.

25. In combination, a condenser including water piping, a compressor leading into the condenser, an alternating current motor for driving the compressor, starting means for accelerating the motor up to a full speed and for permitting it to drop to low speed, and means dependent upon normal conditions of the water for said piping to permit the actuation of the starting means.

GEORGE P. CARROLL.

Witnesses:
JOHN C. HYDE,
EDMUND W. CHAPIN.